United States Patent
Harada et al.

(10) Patent No.: US 10,246,611 B2
(45) Date of Patent: Apr. 2, 2019

(54) TRANSPARENT FILM

(71) Applicant: SUMITOMO CHEMICAL COMPANY, LIMITED, Tokyo (JP)

(72) Inventors: Yoshihiro Harada, Osaka (JP); Yasuharu Shimazaki, Osaka (JP); Tomonori Miyamoto, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/525,177

(22) PCT Filed: Nov. 9, 2015

(86) PCT No.: PCT/JP2015/081504
§ 371 (c)(1),
(2) Date: May 8, 2017

(87) PCT Pub. No.: WO2016/076274
PCT Pub. Date: May 19, 2016

(65) Prior Publication Data
US 2017/0313905 A1    Nov. 2, 2017

(30) Foreign Application Priority Data

Nov. 12, 2014 (JP) ................. 2014-230154

(51) Int. Cl.
*C09D 183/08* (2006.01)
*C03C 17/30* (2006.01)
*C09D 5/00* (2006.01)
*C09D 5/16* (2006.01)

(52) U.S. Cl.
CPC ............ *C09D 183/08* (2013.01); *C03C 17/30* (2013.01); *C09D 5/00* (2013.01); *C09D 5/165* (2013.01); *C09D 5/1675* (2013.01); *C03C 2217/75* (2013.01); *C03C 2218/116* (2013.01)

(58) Field of Classification Search
CPC ........ C09D 183/08; C09D 5/00; C03C 17/30; C03C 2217/75
USPC ....................................................... 524/858
See application file for complete search history.

(56) References Cited

U.S. PATENT DOCUMENTS

| 2004/0076840 | A1* | 4/2004 | Akamatsu | C03C 17/002 428/451 |
|---|---|---|---|---|
| 2007/0053062 | A1 | 3/2007 | Sasaki et al. | |
| 2015/0118502 | A1* | 4/2015 | Mitsuhashi | C08G 65/336 428/429 |
| 2017/0015842 | A1 | 1/2017 | Hozumi et al. | |

FOREIGN PATENT DOCUMENTS

| JP | 2002-256258 | A | | 9/2002 | |
| JP | 2002256258 | | * | 9/2002 | |
| JP | 2004-122106 | A | | 4/2004 | |
| JP | 2008-96516 | A | | 4/2008 | |
| JP | 2008-137858 | A | | 6/2008 | |
| JP | 2011-174001 | A | | 9/2011 | |
| JP | 2012-46765 | A | | 3/2012 | |
| JP | 2012046765 | | * | 3/2012 | |
| JP | 2013-213181 | A | | 10/2013 | |
| JP | 2014-15609 | A | | 1/2014 | |
| JP | 2014037548 | A | * | 2/2014 | ........... C08G 65/336 |
| JP | 2014-185334 | A | | 10/2014 | |
| WO | WO 2010/074264 | A1 | | 7/2010 | |

OTHER PUBLICATIONS

Translation of JP2002-256258, Sep. 11, 2002. (Year: 2002).*
Translation of JP 2012-046765, Mar. 8, 2012. (Year: 2012).*
International Search Report issued in PCT/JP2015/081422, dated Jan. 19, 2016.
International Search Report issued in PCT/JP2015/081504, dated Jan. 19, 2016.
Synquest Laboratories, "(3,3,3-Trifluoropropyl)dimethylchlorosilane", product # 5181-7-09, 2010, 1 page (http://www.synquestlabs.com/product/id/27794.html).
U.S. Office Action dated Oct. 5, 2018 for U.S. Appl. No. 15/525,188.
Chinese Office Action and Search Report dated Oct. 31, 2018 for corresponding Application No. 201580060808.1 with English Translation.
Chinese Office Action (including an English translation thereof) issued in the Chinese Patent Application No. 201580059039.3 dated Nov. 1, 2018.
Chinese Office Action (including an English translation thereof) issued in the Chinese Patent Application No. 201580059081.5 dated Oct. 24, 2018.
Chinese Office Action (including an English translation thereof) issued in the Chinese Patent Application No. 201580059125.4 dated Nov. 29, 2018.
Chinese Office Action (including an English translation thereof) issued in the Chinese Patent Application No. 201580061118.8 dated Nov. 29, 2018.

* cited by examiner

Primary Examiner — Hui H Chin
(74) Attorney, Agent, or Firm — Birch, Stewart, Kolasch & Birch, LLP

(57) ABSTRACT

The object of present invention is to provide a transparent film which further improves a slip characteristic of waterdrop. The present invention is a transparent film having a polysiloxane backbone, the transparent film having a structure (a) in which a fluorine-containing group having a perfluoroalkyl group or a perfluoropolyether group on the free end side thereof is bonded to a silicon atom of the polysiloxane backbone, and the transparent film having a slip rate of 0.2 mm/s or more for a 120 μl waterdrop on an 8° incline. In preferred embodiment, the fluorine-containing groups are bonded to some silicon atoms of the polysiloxane backbone in structure (a), and the transparent film has a structure (b) in which carbon fluoride-containing groups or hydrolysable silane oligomer residue are bonded to some of the remaining silicon atoms of the polysiloxane backbone.

10 Claims, No Drawings

TRANSPARENT FILM

TECHNICAL FIELD

The present invention relates to a transparent film, and especially a transparent film having a slip characteristic.

In the application of a film having water repellency and oil repellency, e.g., window glass of automobiles and buildings, an abrasion resistance of the film, a slip characteristic of waterdrop, or the like are required in addition to water-repellent and oil-repellent functions.

For example, in Patent Document 1 is disclosed a water-repellent and oil-repellent antifouling glass plate on which a film containing a long chain substance having a carbon fluoride group and a hydrocarbon group as major components, a short chain substance having a carbon fluoride group, a hydrocarbon group, and a silyl group as major components, and a substance having a siloxane group as a major component has been formed. Patent Document 2 discloses a water-repellent and water-separate antifouling treating solution comprising a substance 1 having at least a carbon fluoride group as a major component, a substance 2 having a hydrocarbon group as a major component, and a solvent. Moreover, Patent Document 3 discloses a solution for forming a water-repellent and oil-repellent antifouling composite film that is a solution prepared by diluting, with an organic solvent, a first substance containing a carbon fluoride group containing at least an organic fluorine-containing ether group or an organic fluorine-containing polyether group, a hydrocarbon group, and an alkoxysilyl group, a second substance containing a carbon fluoride group, a hydrocarbon group, and an alkoxysilyl group and differing from the first substance, a third substance represented by $(AO)_3Si(OSi(OA)_p OA$, wherein p can be 0 or an integer, A can be an alkyl group, OA can be Cl or NCO, and a silanol condensation catalyst, wherein the molecular length of the second substance is shorter than the molecular length of the first substance.

Patent Documents 1 to 3 disclose examples in which a solution for forming a composite film is prepared by dissolving a long chain substance and a short chain substance, e.g. $CF_3-(CF_2)_7-(CH_2)_2-Si(OCH_3)_3$, in a prescribed solvent, and then a glass plate is dipped in this solution to form a composite film on the glass plate (for example, Example 1 of Patent Document 1, Example 8 of Patent Document 2, Example 1 of Patent Document 3). In these examples, it is disclosed that good abrasion resistance and good water-repellent and oil-repellent characteristic were realized. Patent Document 4 discloses a perfluoropolyether group-containing silane compound having repellency to water and oil.

PRIOR ART DOCUMENTS

Patent Documents

Patent Document 1: JP-A-2008-137858
Patent Document 2: JP-A-2011-174001
Patent Document 3: JP-A-2012-46765
Patent Document 4: JP-A-2014-15609

Solutions to the Problems

The object of present invention is to provide a transparent film which further improves a slip characteristic of waterdrop.

The present inventors investigated in order to further improve the slip characteristic of waterdrop of the water-repellent and oil-repellent composite films disclosed in Patent Documents 1 to 3. As a result, they found that if a transparent film has a polysiloxane backbone and, in a structure (a) in which a fluorine-containing group having a perfluoroalkyl group or a perfluoropolyether group on the free end side thereof is bonded to a silicon atom in the polysiloxane backbone, there are spaces between the perfluoroalkyl groups or the perfluoropolyether groups of the structure (a) and the mobility thereof is increased, then a slip characteristic of waterdrop is improved.

The present invention which achieves the problem is a transparent film having a polysiloxane backbone characterized in that the transparent film has a structure (a) in which a fluorine-containing group having a perfluoroalkyl group or a perfluoropolyether group on the free end side thereof is bonded to a silicon atom of the polysiloxane backbone, and the transparent film has a slip rate of 0.2 mm/s or more for a 120 µl waterdrop on an 8° incline. The slip rate is preferably 0.5 mm/s or more (further preferably 1.0 mm/s or more).

The transparent film in which the fluorine-containing groups are bonded to some silicon atoms of the polysiloxane backbone in structure (a) and which has a structure (b) in which carbon fluoride-containing groups or hydrolysable silane oligomer residue are bonded to some of the remaining silicon atoms of the polysiloxane backbone, further improves the slip rate of waterdrop and the slip rate for a 120 µl waterdrop on an 8° incline becomes to be 1.0 mm/s or more.

The fluorine-containing group of the structure (a) preferably comprises a hydrocarbon group. It is also preferred that the molecular length of the structure (b) is shorter than the molecular length of the structure (a). Specifically, the longest straight chain of an alkyl group, a fluorine-containing alkyl group, or the carbon fluoride-containing group of the structure (b) is shorter in the number of atoms than the longest straight chain part of the fluorine-containing group of the structure (a).

It is preferred that the carbon fluoride-containing group or the hydrolyzable silane oligomer residue of the structure (b) is each represented by the following formula (1-1) or (2-1).

[Chemical formula 1]

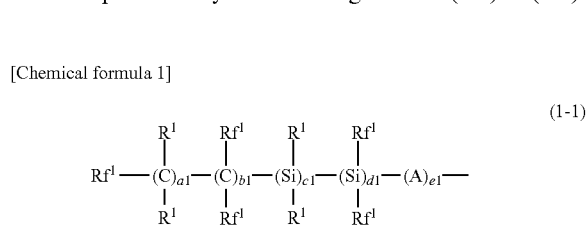

[Chemical formula 2]

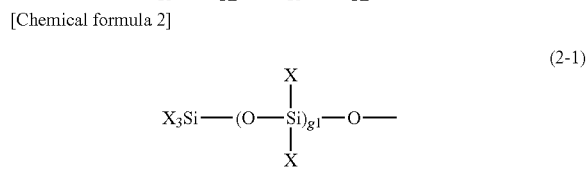

In formulae (1-1) and (2-1),
$Rf^1$ each independently represents a fluorine atom or an alkyl group substituted with one or more fluorine atoms and having 1 to 20 carbon atoms;
$R^1$ each independently represents a hydrogen atom or a lower alkyl group; A each independently represents —O—, —COO—, —OCO—, —NR—, —NRCO—, and —CONR—, wherein R represents a hydrogen atom, a lower alkyl group, or a lower fluorine-containing alkyl group;

X each independently represents a hydrolyzable group, a lower alkyl group, or a lower fluorine-containing alkyl group;

a1, b1, c1, d1, e1, and g1 each independently are an integer of not less than 0 and not more than 100, each of repeating units enclosed in parentheses with a1, b1, c1, d1, or e1 added thereto is present in arbitrary order in the formula, and the sum total of a1, b1, c1, d1, and e1 is 100 or less.

Effects of the Invention

The transparent film of the present invention can improve a slip characteristic of waterdrop.

MODE FOR CARRYING OUT THE INVENTION

The transparent film of the present invention has a polysiloxane backbone, wherein in a structure (a) in which a fluorine-containing group having a perfluoroalkyl group or a perfluoropolyether group on the free end thereof is bonded to a silicon atom of the polysiloxane backbone, there are spaces between the perfluoroalkyl groups or the perfluoropolyether groups of the structure (a) and the motility is increased, and the slip rate of a 120 µl waterdrop on an 8° incline can be adjusted to 0.2 mm/s or more.

Specifically, the spaces can be provided by adjusting the concentration of the compound to serve as a raw material of the structure (a) (the compound (A) described below) or the thickness of the film.

Alternatively, it is also possible to provide the spaces by producing a configuration wherein the fluorine-containing groups are bonded to some silicon atoms of the polysiloxane backbone in the structure (a) and carbon fluoride-containing groups or hydrolysable silane oligomer residues are bonded to some of the remaining silicon atoms of the polysiloxane backbone in a structure (b). In such an embodiment, a slip rate of waterdrop further increases. In the embodiment having the structure (b), since the fluorine-containing groups are bonded to not all but some of the silicon atoms of the polysiloxane backbone, the perfluoroalkyl groups or the perfluoropolyether groups of the structure (a) are arranged in a state of sandwiching the remaining silicon atoms (or siloxane linkages) of the polysiloxane backbone therebetween, and therefore the slip characteristic of waterdrop are improved. The free end mentioned above means an end of a side where a silicon atom is not bonded to in the fluorine-containing group.

The perfluoroalkyl group has water repellency and oil repellency. Slip characteristic of waterdrop is improved due to the fact that the perfluoroalkyl group exists on the free end side of the fluorine-containing group. The number of carbon atoms (especially, the number of carbon atoms of the longest straight chain portion) of the perfluoroalkyl group is preferably 3 or more, more preferably 5 or more, and even more preferably 7 or more. The upper limit of the number of carbon atoms is not particularly limited, and a good slip characteristic is exhibited even if the number of carbon atoms is about 20, for example.

The perfluoropolyether group is a group derived from a polyalkylene ether group or a polyalkylene glycol dialkyl ether residue by replacing all hydrogen atoms thereof with fluorine atoms, and it can also be called a perfluoropolyalkylene ether group or a perfluoropolyalkylene glycol dialkyl ether residue. The perfluoropolyether group also has water repellency and oil repellency. The number of the carbon atoms contained in the longest straight chain portion of the perfluoropolyether group is preferably 5 or more, more preferably 10 or more, and even more preferably 20 or more. The upper limit of the number of the carbon atoms is not particularly limited, and the number of the carbon atoms may be about 200, for example.

The fluorine-containing group should just have the above-mentioned perfluoroalkyl group or perfluoropolyether group on the free end side thereof. Therefore, there may be an appropriate linking group on the side where the fluorine-containing group is bonded to a silicon atom of the polysiloxane backbone, or alternatively the above-mentioned perfluoroalkyl group or perfluoroalkyl group may be bonded directly to a silicon atom without the linking group. Examples of the linking group include hydrocarbon groups such as alkylene groups, aromatic hydrocarbon groups, (poly)alkylene glycol groups, groups derived from the foregoing by replacing some of the hydrogen atoms thereof with F, and groups in which the foregoing are linked appropriately. The number of the carbon atom of the linking group is, for example, not less than 1 and not more than 20, and is preferably not less than 2 and not more than 10.

Two or more silicon atoms may be bonded to one linking group, and two or more perfluoroalkyl groups or perfluoropolyether groups may be bonded to one linking group.

Although the number of the fluorine-containing groups bonded to a silicon atom should just be 1 or more and may be 2 or 3, it is preferably 1 or 2, and particularly preferably is 1.

The fluorine-containing group may be in a straight chain form or alternatively may have a side chain.

Of structures (a), examples of a fluorine-containing group having a perfluoroalkyl group on the free end side thereof include groups represented by the following formula (3-1) or (4-1).

[Chemical formula 3]

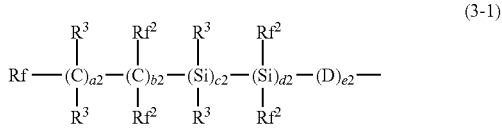

(3-1)

In the formula (3-1),

Rf represents a fluorine atom or an alkyl group which has 1 to 20 carbon atoms and is substituted with one or more fluorine atoms. Rf is preferably an alkyl group which has 1 to 10 carbon atoms and is substituted with one or more fluorine atoms, more preferably is a perfluoroalkyl group having 1 to 10 carbon atoms, and even more preferably is a perfluoroalkyl group having 1 to 5 carbon atoms.

$Rf^2$ each independently represents a fluorine atom or an alkyl group which has 1 to 20 carbon atoms and is substituted with one or more fluorine atoms. Preferably, $Rf^2$ each independently represents a fluorine atom or a fluorine-containing alkyl group having 1 to 2 carbon atoms, and more preferably, all $Rf^2$ are fluorine atoms. $R^3$ each independently represents a hydrogen atom or a lower alkyl group. Preferably, $R^3$ is each independently a hydrogen atom or an alkyl group having one or two carbon atoms, and more preferably, all $R^3$ are hydrogen atoms.

D each independently represents —O—, —COO—, —OCO—, —NR—, —NRCO—, or —CONR—, wherein R represents a hydrogen atom, a lower alkyl group, or a lower fluorine-containing alkyl group. Preferably, D each independently is —COO—, —O—, or —OCO—, and more preferably, all D are —O—.

a2, b2, c2, d2, and e2 are each independently an integer of not less than 0 and not more than 600, and the sum total of a2, b2, c2, d2, and e2 is 13 or more. Preferably, a2, c2, and d2 are each independently equal to or smaller than ½ of b2, and more preferably equal to or smaller than ¼ of b2, and even more preferably, c2 or d2 is 0, and particularly preferably, c2 and d2 are 0.

e2 is preferably equal to or more than ⅕ of the sum total of a2, b2, c2, and d2 and equal to or less than the sum total of a2, b2, c2, and d2.

b2 is preferably not less than 20 and not more than 600, more preferably not less than 20 and not more than 200, and even more preferably not less than 50 and not more than 200.

e2 is preferably not less than 4 and not more than 600, more preferably not less than 4 and not more than 200, and even more preferably not less than 10 and not more than 200.

The sum total of a2, b2, c2, d2, and e2 is preferably not less than 20 and not more than 600, more preferably not less than 20 and not more than 200, and even more preferably not less than 50 and not more than 200.

Although each of repeating units enclosed in parentheses with a2, b2, c2, d2, or e2 added thereto is present in arbitrary order in the formula, it is preferred that the repeating unit which is enclosed in parentheses with b2 and located closest to the fixed end (on the side where the fluorine-containing group is bonded to a silicon atom) is located closer to the free end than the repeating unit which is enclosed in parentheses with a2 and located closest to the free end, and it is more preferred that the repeating unit which is enclosed in parentheses with b2 or d2 and located closest to the fixed end is located closer to the free end than the repeating unit which is enclosed in parentheses with a2 or c2 and located closest to the free end.

[Chemical formula 4]

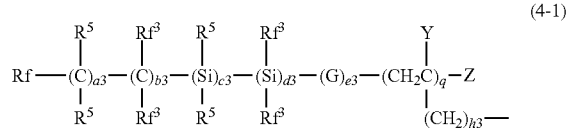

(4-1)

In the formula (4-1), Rf represents a fluorine atom or an alkyl group which has 1 to 20 carbon atoms and is substituted with one or more fluorine atoms. Rf is preferably an alkyl group which has 1 to 10 carbon atoms and substituted with one or more fluorine atoms, more preferably is a perfluoroalkyl group having 1 to 10 carbon atoms, and even more preferably is a perfluoroalkyl group having 1 to 5 carbon atoms.

$Rf^3$ each independently represents a fluorine atom or an alkyl group which has 1 to 20 carbon atoms and is substituted with one or more fluorine atoms. Preferably, $Rf^3$ each independently represents a fluorine atom or a fluorine-containing alkyl group having 1 to 2 carbon atoms, and more preferably, all $Rf^3$ are fluorine atoms. $R^5$ each independently represents a hydrogen atom or a lower alkyl group. Preferably, $R^5$ is each independently a hydrogen atom or an alkyl group having one or two carbon atoms, and more preferably, all $R^5$ are hydrogen atoms.

G each independently represents —O—, —COO—, —OCO—, —NR—, —NRCO—, or —CONR—, wherein R represents a hydrogen atom, a lower alkyl group, or a lower fluorine-containing alkyl group. Preferably, G each independently is —COO—, —O—, or —OCO—, and more preferably, all G are —O—.

Y each independently represents a hydrogen atom or a lower alkyl group. Preferably Y is each independently a hydrogen atom or an alkyl group having one or two carbon atoms, and more preferably, all Y are hydrogen atoms.

Z each independently represents a hydrogen atom or a halogen atom. Preferably, Z is a hydrogen atom.

a3, b3, c3, d3, and e3 are each independently an integer of not less than 0 and not more than 600, and the sum total of a3, b3, c3, d3, and e3 is 13 or more. Preferably, a3, c3, and d3 are each independently not more than ½ of b3, more preferably not more than ¼ of b3, and more preferably, c3 or d3 is 0, and particularly preferably, c3 and d3 are 0.

e3 is preferably not less than ⅕ of the sum total of a3, b3, c3, and d3 and equal to or less than the sum total of a3, b3, c3, and d3.

b3 is preferably not less than 20 and not more than 600, more preferably not less than 20 and not more than 200, and even more preferably not less than 50 and not more than 200.

e3 is preferably not less than 4 and not more than 600, more preferably not less than 4 and not more than 200, and even more preferably not less than 10 and not more than 200. The sum total of a3, b3, c3, d3, and e3 is preferably not less than 20 and not more than 600, preferably not less than 20 and not more than 200, and more preferably not less than 50 and not more than 200.

h3 is an integer of not less than 0 and not more than 2, preferably not less than 0 and not more than 1, and q is an integer of not less than 1 and not more than 10, preferably not less than 1 and not more than 8.

Although each of repeating units enclosed in parentheses with a3, b3, c3, d3, or e3 added thereto is present in arbitrary order in the formula, it is preferred that the repeating unit which is enclosed in parentheses with b3 and located closest to the fixed end (on the side where the fluorine-containing group is bonded to a silicon atom) is located closer to the free end than the repeating unit which is enclosed in parentheses with a3 and located closest to the free end, and it is more preferred that the repeating unit which is enclosed in parentheses with b3 or d3 and located closest to the fixed end is located closer to the free end than the repeating unit which is enclosed in parentheses with a3 or c3 and located closest to the free end.

In the formulae (3-1) and (4-1), "lower" means that the number of carbon atom(s) is 1 to 4.

Silicon atoms to which fluorine-containing groups of the structure (a) are not bonded can improve the slip characteristic caused by the fluorine-containing groups of the structure (a), by serving as spacers of the structure (a) in the polysiloxane backbone. Preferably, carbon fluoride-containing groups or hydrolyzable silane oligomer residues are bonded to the silicon atoms to which the fluorine-containing groups of the structure (a) are not bonded (the structure (b)).

Moreover, the molecular length of the structure (b) is preferably shorter than the molecular length of the structure (a). By making the molecular length of the structure (b) short, it becomes easy to expose the fluorine-containing groups of the structure (a) to a film surface and the slip characteristic exerted by the fluorine-containing groups is further improved. The molecular length of the structure (b) is preferably ½ or less, more preferably ⅕ or less, and even more preferably 1/10 or less of the molecular length of the structure (a).

In comparison between the structure (b) and the structure (a) in terms of their molecular length, specifically when hydrolyzable silane oligomer residues having an alkyl group or a fluorine-containing alkyl group are bonded to some silicon atoms in the structure (b), it is preferred that the alkyl group or the fluorine-containing alkyl group is shorter in the number of atoms than the longest straight chain part of the fluorine-containing group of the aforementioned structure (a). For example, when carbon fluoride-containing groups are bonded to some silicon atoms in the structure (b), it is preferred that the longest straight chain part of the carbon fluoride-containing group is shorter in the number of atoms than the longest straight chain part of the fluorine-containing group of the structure (a).

When carbon fluoride-containing groups are bonded to some silicon atoms in the structure (b), the carbon fluoride-containing groups are preferably groups having a fluoroalkyl group at their end, and particularly preferably are groups having a trifluoromethyl group at their end. Examples of the group having a fluoroalkyl group at its end include fluoroalkyl groups, fluoroalkoxyalkylene groups, fluoroalkylsilylalkylene groups, fluoroalkylcarbonyloxyalkylene groups, fluoroalkylarylene groups, fluoroalkylalkenylene groups, and fluoroalkylalkynylene groups.

Examples of the fluoroalkyl groups include fluoroalkyl groups having 1 to 12 carbon atoms such as a fluoromethyl group, a fluoroethyl group, a fluoropropyl group, a fluorobutyl group, a fluoropentyl group, a fluorohexyl group, a fluoroheptyl group, a fluorooctyl group, a fluorononyl group, a fluorodecyl group, a fluoroundecyl group, and a fluorododecyl group.

Examples of the fluoroalkoxyalkylene groups include fluoromethoxy($C_{5-20}$ alkylene) groups, fluoroethoxy($C_{5-20}$ alkylene) groups, fluoropropoxy($C_{5-20}$ alkylene) groups, and fluorobutoxy($C_{5-20}$ alkylene) groups.

Examples of the fluoroalkylsilylalkylene groups include fluoromethylsilyl($C_{5-20}$ alkylene) groups, fluoroethylsilyl($C_{5-20}$ alkylene) groups, fluoropropylsilyl($C_{5-20}$ alkylene) groups, fluorobutylsilyl($C_{5-20}$ alkylene) groups, fluoropentylsilyl($C_{5-20}$ alkylene) groups, fluorohexylsilyl($C_{5-20}$ alkylene) groups, fluoroheptylsilyl($C_{5-20}$ alkylene) groups, and fluorooctylsilyl($C_{5-20}$ alkylene) groups.

Examples of the fluoroalkylcarbonyloxyalkylene groups include fluoromethylcarbonyloxy($C_{5-20}$ alkylene) groups, fluoroethylcarbonyloxy($C_{5-20}$ alkylene) groups, fluoropropylcarbonyloxy($C_{5-20}$ alkylene) groups, and fluorobutylcarbonyloxy($C_{5-20}$ alkylene) groups.

Examples of the fluoroalkylarylene groups include fluoro($C_{1-8}$ alkyl)phenylene groups and fluoro($C_{1-8}$ alkyl)naphthylene groups; examples of the fluoroalkylalkenylene groups include fluoro($C_{1-17}$ alkyl)vinylene groups and fluoro($C_{1-17}$ alkyl)propynylene groups; and examples of the fluoroalkylalkynylene groups include fluoro($C_{1-17}$ alkyl)ethynylene groups and fluoro($C_{1-17}$ alkyl)propynylene groups.

When hydrolyzable silane oligomer residues are bonded to some of the silicon atoms in the structure (b), a hydrolyzable silane oligomer residue means a group derived from an oligomer generated through hydrolytic condensation of a compound having two or more hydrolyzable groups, preferably a silane compound having two or more (especially, three) hydrolyzable groups and fluorine-containing groups (especially, lower fluorine-containing alkyl groups), by changing one alkoxy group of the oligomer to a bond (—O—). The number of the silicon atoms contained in the oligomer residue (the number of condensation) is 3 or more, for example, and preferably 5 or more, more preferably 7 or more. The number of condensation is preferably 15 or less, more preferably 13 or less, and even more preferably 10 or less.

When the oligomer residue has an alkoxy group, examples of the alkoxy group include a methoxy group, an ethoxy group, a propoxy group, and a butoxy group, and preferred are a methoxy group, an ethoxy group, and the like. The oligomer residue can have such hydrolyzable groups of one type or alternatively of two or more types, and preferably has one type of hydrolyzable groups.

In order to improve the compatibility with the structure (a), the structure (b) preferably contains a fluorine atom, and a structure represented by the following (1-1) is more preferred from simplicity in its synthesis.

The carbon fluoride-containing group of the structure (b) can preferably be represented by the following formula (1-1), and the hydrolyzable silane oligomer residue can preferably be represented by the following formula (2-1),

[Chemical Formula 5]

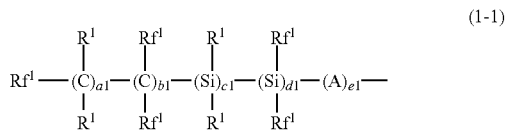

(1-1)

In the formula (1-1), $Rf^1$ each independently represents a fluorine atom or an alkyl group which has 1 to 20 carbon atoms and is substituted with one or more fluorine atoms;

$R^1$ each independently represents a hydrogen atom or a lower alkyl group;

A each independently represents —O—, —COO—, —OCO—, —NR—, —NRCO—, or —CONR—, wherein R represents a hydrogen atom, a lower alkyl group, or a lower fluorine-containing alkyl group;

a1, b1, c1, d1, and e1 each independently are an integer of not less than 0 and not more than 100, each of repeating units enclosed in parentheses with a1, b1, c1, d1, or e1 added thereto is present in arbitrary order in the formula, the sum total of a1, b1, c1, d1, and e1 is 100 or less.

$Rf^1$ preferably is a fluorine atom or a perfluoroalkyl having 1 to 10 carbon atoms (more preferably 1 to 5 carbon atoms). $R^1$ is preferably a hydrogen atom or an alkyl having 1 to 4 carbon atoms. A is preferably —O—, —COO—, or —OCO—. In addition, a1 is preferably 1 to 30, more preferably 1 to 25, even more preferably 1 to 10, particularly preferably 1 to 5, and most preferably 1 to 2. b1 is preferably 0 to 15, more preferably 0 to 10. c1 is preferably 0 to 5, more preferably 0 to 2. d1 is preferably 0 to 4, more preferably 0 to 2. e1 is preferably 0 to 4, more preferably 0 to 2. The sum total of a1, b1, c1, d1, and e1 is preferably 3 or more, more preferably 5 or more, and is preferably 80 or less, more preferably 50 or less, even more preferably 20 or less.

In particular, it is preferred that $Rf^1$ is a fluorine atom or a perfluoroalkyl having 1 to 5 carbon atoms, $R^1$ is a hydrogen atom, c1, d1, and e1 are each 0, a1 is 1 to 5, and b1 is 0 to 5.

The fluorine-containing group include $C_jF_{2j+1}$— (j is an integer of 1 to 12), $CF_3CH_2O(CH_2)_k$—, $CF_3(CH_2)_iSi(CH_3)_2(CH_2)_k$—, $CF_3COO(CH_2)_k$— (i is 1 to 7, preferably 2 to 6, all of k are 5 to 20, preferably 8 to 15), for example, and also preferred are $CF_3(CF_2)_m$—$(CH_2)_n$—, $CF_3(CF_2)_m$—$C_6H_4$— (all of m are 1 to 10, preferably 3 to 7, all of n are 1 to 5, preferably 2 to 4).

The following formula (2-1) is a preferable example of hydrolyzable silane oligomer residue in structure (b).

[Chemical Formula 6]

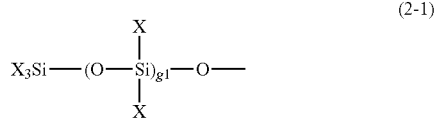
(2-1)

In the above formula (2-1),

X each independently represents a hydrolyzable group, a lower alkyl group, or a lower fluorine-containing alkyl group, and g1 is an integer of not less than 0 and not more than 100.

In the formulae (1-1) and (2-1), "lower" means that the number of carbon atom(s) is 1 to 4.

Examples of the hydrolyzable group include alkoxy groups such as a methoxy group, an ethoxy group, a propoxy group, and a butoxy group, and an allyl group. g1 is preferably not less than 0 and not more than 10, and more preferably not less than 0 and not more than 7. It is also preferred that at least one of X is a lower fluorine-containing alkyl group. At least one of X preferably contains a hydrolyzable group (especially, an ethoxy group, a methoxy group, or an allyl group).

As the hydrolyzable silane oligomer residue, for example, there can be included $(H_5C_2O)_3$—Si—$(OSi(OC_2H_5)_2)_4O$—, $(H_3CO)_2Si(CH_2CH_2CF_3)$—$(OSiOCH_3(CH_2CH_2CF_3))_4$—O—.

The remaining bond or bonds of the silicon atom to which the fluorine-containing group is bonded in the structure (a) may form a siloxane linkage (in other words, —O—Si— is bonded), for example, may bond to an alkyl group (especially, an alkyl group having 1 to 4 carbon atom(s)), H, or NCO. Also with respect to the silicon atom to which the carbon fluoride-containing group or the hydrolyzable silane oligomer residue is bonded in the structure (b), the remaining bond or bonds may form a siloxane linkage, and, for example, an alkyl group (especially, an alkyl group having 1 to 4 carbon atoms), H, a cyano group, or the like may be bonded thereto.

The presence ratio of the structure (b) to the structure (a) is preferably 0.1 to 50, more preferably 0.5 to 30, and even more preferably 1 to 15.

The transparent film of the present invention has water repellency and oil repellency and it is excellent in a slip characteristic of waterdrop. With respect to a slip characteristic of waterdrop, the slip rate of a 120 μl waterdrop on an 8° incline is 0.2 mm/s or more (preferably is 0.5 mm/s or more, more preferably 1.0 mm/s or more). Although the upper limit of the slip rate of a waterdrop is not limited, it is usually 5.0 mm/s or less. With respect to water repellency, for example, the contact angle measured by a θ/2 method with a waterdrop amount of 3 μl on a smooth surface with no irregularities is 90° or more (preferably 100° or more; The upper is not limited, and 120° or less, for example). The thickness of the transparent film of the present invention is preferably 2 to 50 nm, more preferably 2 to 20 nm, and even more preferably 2 to 10 nm.

The total light transmittance in accordance with JIS K7136-1 or JIS K7375 of the transparent film of the present invention is preferably 70% or more, more preferably 80% or more, and even more preferably 85% or more.

The substrate on which the transparent film of the present invention is to be formed is not particularly limited and may be made of either an organic material or an inorganic material, and the shape thereof may be either a planar surface or a curved surface or also may be in a three-dimensional structure in which many faces are combined. Examples of the organic material include thermoplastic resins such as acrylic resin, polycarbonate resin, polyester resin, styrene resin, acrylic-styrene copolymerized resin, cellulosic resin, polyolefin resin, polyvinyl alcohol; and thermosetting resins such as phenolic resin, urea resin, melamine resin, epoxy resin, unsaturated polyester, silicone resin, and urethane resin. Examples of the inorganic material include metals such as iron, silicon, copper, zinc, and aluminum, alloys containing such metals, ceramics, and glass.

The substrate may have been subjected to adhesion-facilitating treatment. Examples of the adhesion-facilitating treatment include hydrophilizing treatment such as corona treatment, plasma treatment, and ultraviolet treatment. Moreover, primer treatment with resin, a silane coupling agent, a tetraalkoxysilane, or the like may also be employed.

The transparent film of the present invention can suitably be formed on a display device such as a touch panel display, an optical element, a semiconductor element, a building material, a nanoimprint technology, a solar cell, a window glass of a car or a building, metal parts of cookware, ceramic products such as tableware, automotive parts made of plastics, or the like and therefore is useful industrially. It can also be used for a fishing net, an insect collecting net, a water tank, or the like. Moreover, it can also be used for a kitchen, a bathroom, a washstand, a mirror, items in toilet areas, a chandelier, potteries such as tiles, artificial marble, and indoor facilities such as an air-conditioner. Moreover, it can also be used as antifouling treatment for jigs, inner walls, piping, or the like in factories. It is also suitable for goggles, glasses, helmets, pachinko, fibers, umbrellas, playing tools, soccer balls, or the like. Moreover, it can also be used as an adhesion inhibitor for various wrapping materials such as wrapping materials for foodstuffs, wrapping materials for cosmetics, and interior parts of pots.

The transparent film of the present invention is obtained by forming a film on a substrate from a solution for film formation, leaving the film in the air, and preferably further heating and drying (for example, at 50 to 300° C., preferably at 100 to 200° C.). The solution for film formation comprises a first organic silicon compound (A) in which a fluorine-containing group having a perfluoroalkyl group or a perfluoropolyether group on the free end side thereof and a hydrolyzable group are bonded to a silicon atom thereof and preferably comprises a prescribed second organic silicon compound (B) having a hydrolyzable group and being to serve as a spacer for the organic silicon compound (A), and preferably has been diluted with a solvent (C). Hydrolyzable groups of the compound (A) undergo hydrolysis and a dehydration condensation reaction owing to the moisture in the air, so that a polysiloxane backbone is formed and the aforementioned structure (a) in which a fluorine-containing group is bonded to a silicon atom of the polysiloxane backbone is formed. By using, in addition to the compound (A), a compound in which a carbon fluoride-containing group and the hydrolyzable group are bonded to a silicon atom or a hydrolyzable silane oligomer as the second organic silicon compound (B), a transparent film of the present invention having further improved slip characteristic of waterdrop can be obtained. In order to improve the compatibility with the compound A, it is preferred that the second organic silicon compound (B) contains a fluorine atom.

In terms of improving the abrasion resistance of a resulting transparent film, it is preferred to use, as the second organic silicon compound (B), a compound having a vapor pressure at 100° C. of 1 atm or less (having a boiling point of 100° C. or more when the second organic silicon compound (B) has a boiling point).

In the first organic silicon compound (A), a fluorine-containing group having a perfluoroalkyl group or a perfluoropolyether group on the free end side thereof and a hydrolyzable group are bonded to a silicon atom. The fluorine-containing group of the first organic silicon compound (A) means the same fluorine-containing group as that of the structure (a) described above. Therefore, the contents described for the fluorine-containing group of the structure (a) can entirely apply to the fluorine-containing group of the first organic silicon compound (A).

The hydrolyzable group which bonds to a silicon atom in the structure (a) has an operation of bonding (1) organic silicon compounds (A) to each other, or (2) organic silicon compound (A) to an active hydrogen (e.g., a hydroxyl group) located on a surface of a substrate, or (3) organic silicon compounds (A) and (B) to each other. Examples of such a hydrolyzable group include an alkoxy group (especially, an alkoxy group having 1 to 4 carbon atoms), a hydroxy group, an acetoxy group, an allyl group, and a halogen atom (especially, a chlorine atom). Preferable hydrolyzable groups are alkoxy groups, allyl groups, and halogen atoms, and especially, a methoxy group, an ethoxy group, an allyl group, and a chlorine atom are preferred.

Although the number of the hydrolyzable groups bonded to a silicon atom in the first organic silicon compound (A) should just be 1 or more and may be 2 or 3, it is preferably 2 or 3, and particularly preferably is 3. When two or more hydrolyzable groups are bonded to a silicon atom, different hydrolyzable groups may be bonded to the silicon atom, and the same hydrolyzable groups are preferably bonded to the silicon atom.

Although the total number of the fluorine-containing groups and the hydrolyzable groups which are bonded to a silicon atom is usually 4, it may be 2 or 3 (especially, 3). When the total number is 3 or less, an alkyl group (especially, an alkyl group having 1 to 4 carbon atoms), H, NCO, or the like can be bonded to the remaining bond or bonds.

The molecular weight of the compound (A) is, for example, 6000 to 20000.

Of first organic silicon compounds (A), examples of a compound having a perfluoroalkyl group as the free end thereof include compounds having the following formula (3-2) or (4-2).

[Chemical Formula 7]

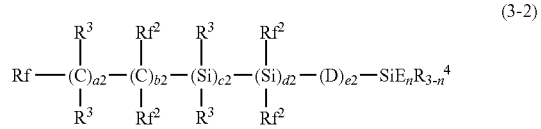

(3-2)

In the formula (3-2), Rf represents a fluorine atom or an alkyl group which has 1 to 20 carbon atoms and is substituted with one or more fluorine atoms. Rf is preferably an alkyl group which has 1 to 10 carbon atoms and is substituted with one or more fluorine atoms, more preferably is a perfluoroalkyl group having 1 to 10 carbon atoms, and even more preferably is a perfluoroalkyl group having 1 to 5 carbon atoms.

$Rf^2$ each independently represents a fluorine atom or an alkyl group which has 1 to 20 carbon atoms and is substituted with one or more fluorine atoms. Preferably, $Rf^2$ each independently represents a fluorine atom or a fluorine-containing alkyl group having 1 to 2 carbon atoms, and more preferably, all $Rf^2$ are fluorine atoms. $R^3$ each independently represents a hydrogen atom or a lower alkyl group. Preferably, $R^3$ is each independently a hydrogen atom or an alkyl group having one or two carbon atoms, and more preferably, all $R^3$ are hydrogen atoms.

$R^4$ each independently represents an alkyl group having 1 to 20 carbon atoms. Preferably, $R^4$ is an alkyl group having 1 to 5 carbon atoms.

D each independently represents —O—, —COO—, —OCO—, —NR—, —NRCO—, or —CONR—, wherein R represents a hydrogen atom, a lower alkyl group, or a lower fluorine-containing alkyl group. Preferably, D each independently is —COO—, —O—, or —OCO—, and more preferably, all D are —O—.

E each independently represents a hydrolyzable group. Preferred as E are an alkoxy group having 1 to 4 carbon atoms, an allyl group, and a halogen atom, and particularly preferred are a methoxy group, an ethoxy group, an allyl group, and a chlorine atom.

a2, b2, c2, d2, and e2 are each independently an integer of not less than 0 and not more than 600, and the sum total of a2, b2, c2, d2, and e2 is 13 or more. Preferably, a2, c2, and d2 are each independently equal to or smaller than ½ of b2, and more preferably equal to or smaller than ¼ of b2, and even more preferably, c2 or d2 is 0, and particularly preferably, c2 and d2 are 0.

e2 is preferably equal to or more than ⅕ of the sum total of a2, b2, c2, and d2 and equal to or less than the sum total of a2, b2, c2, and d2.

b2 is preferably not less than 20 and not more than 600, more preferably not less than 20 and not more than 200, and even more preferably not less than 50 and not more than 200.

e2 is preferably not less than 4 and not more than 600, more preferably not less than 4 and not more than 200, and even more preferably not less than 10 and not more than 200.

The sum total of a2, b2, c2, d2, and e2 is preferably not less than 20 and not more than 600, more preferably not less than 20 and not more than 200, and even more preferably not less than 50 and not more than 200.

Although each of repeating units enclosed in parentheses with a2, b2, c2, d2, or e2 added thereto is present in arbitrary order in the formula, it is preferred that the repeating unit which is enclosed in parentheses with b2 and located closest to the fixed end (on the side where the fluorine-containing group is bonded to a silicon atom) is located closer to the free end than the repeating unit which is enclosed in parentheses with a2 and located closest to the free end, and it is more preferred that the repeating unit which is enclosed in parentheses with b2 or d2 and located closest to the fixed end is located closer to the free end than the repeating unit which is enclosed in parentheses with a2 or c2 and located closest to the free end.

n is an integer of not less than 1 and not more than 3. n is preferably not less than 2 and not more than 3, and more preferably 3.

[Chemical Formula 8]

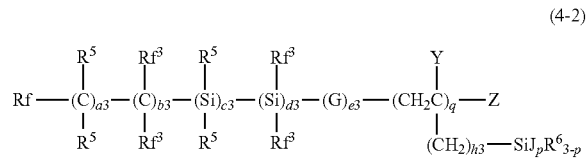

(4-2)

In the formula (4-2), Rf represents a fluorine atom or an alkyl group which has 1 to 20 carbon atoms and is substituted with one or more fluorine atoms. Rf is preferably an alkyl group which has 1 to 10 carbon atoms and substituted with one or more fluorine atoms, more preferably is a perfluoroalkyl group having 1 to 10 carbon atoms, and even more preferably is a perfluoroalkyl group having 1 to 5 carbon atoms.

$Rf^3$ each independently represents a fluorine atom or an alkyl group which has 1 to 20 carbon atoms and is substituted with one or more fluorine atoms. Preferably, $Rf^3$ each independently represents a fluorine atom or a fluorine-containing alkyl group having 1 to 2 carbon atoms, and more preferably, all $Rf^3$ are fluorine atoms. $R^5$ each independently represents a hydrogen atom or a lower alkyl group. Preferably, $R^5$ is each independently a hydrogen atom or an alkyl group having one or two carbon atoms, and more preferably, all $R^5$ are hydrogen atoms.

$R^6$ each independently represents an alkyl group having 1 to 20 carbon atoms. Preferably, $R^6$ is an alkyl group having 1 to 5 carbon atoms.

G each independently represents —O—, —COO—, —OCO—, —NR—, —NRCO—, or —CONR—, wherein R represents a hydrogen atom, a lower alkyl group, or a lower fluorine-containing alkyl group. Preferably, G each independently is —COO—, —O—, or —OCO—, and more preferably, all G are —O—.

J each independently represents a hydrolyzable group. Preferred as J are an alkoxy group, an allyl group, and a halogen atom, and particularly preferred are a methoxy group, an ethoxy group, an allyl group, and a chlorine atom.

Y each independently represents a hydrogen atom or a lower alkyl group. Preferably Y is each independently a hydrogen atom or an alkyl group having one or two carbon atoms, and more preferably, all Y are hydrogen atoms.

Z each independently represents a hydrogen atom or a halogen atom. Preferably, Z is a hydrogen atom.

a3, b3, c3, d3, and e3 are each independently an integer of not less than 0 and not more than 600, and the sum total of a3, b3, c3, d3, and e3 is 13 or more. Preferably, a3, c3, and d3 are each independently not more than ½ of b3, more preferably not more than ¼ of b3, and more preferably, c3 or d3 is 0, and particularly preferably, c3 and d3 are 0.

e3 is preferably not less than ⅕ of the sum total of a3, b3, c3, and d3 and equal to or less than the sum total of a3, b3, c3, and d3.

b3 is preferably not less than 20 and not more than 600, more preferably not less than 20 and not more than 200, and even more preferably not less than 50 and not more than 200. e3 is preferably not less than 4 and not more than 600, more preferably not less than 4 and not more than 200, and even more preferably not less than 10 and not more than 200. The sum total of a3, b3, c3, d3, and e3 is preferably not less than 20 and not more than 600, preferably not less than 20 and not more than 200, and more preferably not less than 50 and not more than 200.

h3 is an integer of not less than 0 and not more than 2, preferably not less than 0 and not more than 1, and q is an integer of not less than 1 and not more than 10, preferably not less than 1 and not more than 8.

Although each of repeating units enclosed in parentheses with a3, b3, c3, d3, or e3 added thereto is present in arbitrary order in the formula, it is preferred that the repeating unit which is enclosed in parentheses with b3 and located closest to the fixed end (on the side where the fluorine-containing group is bonded to a silicon atom) is located closer to the free end than the repeating unit which is enclosed in parentheses with a3 and located closest to the free end, and it is more preferred that the repeating unit which is enclosed in parentheses with b3 or d3 and located closest to the fixed end is located closer to the free end than the repeating unit which is enclosed in parentheses with a3 or c3 and located closest to the free end.

p is an integer of not less than 1 and not more than 3, preferably not less than 2 and not more than 3, and more preferably 3.

In the formulae (3-2) and (4-2), "lower" means that the number of carbon atom(s) is 1 to 4.

In the present invention, it is preferred that the second silicon compound (B) is contained. If a compound in which a carbon fluoride-containing group and a hydrolyzable group are bonded to a silicon atom or a hydrolyzable silane oligomer is used for the second organic silicon compound (B) as a spacer, then the slip characteristic of a resulting film are further improved.

In order to improve the compatibility with the compound A, it is preferred that the second organic silicon compound (B) contains a fluorine atom.

In terms of improving the abrasion resistance of a resulting transparent film, it is preferred to use, as the second organic silicon compound (B), a compound having a vapor pressure at 100° C. of 1 atm or less (having a boiling point of 100° C. or more when the second organic silicon compound (B) has a boiling point). Regarding a preferable compound, the temperature at which the vapor pressure of the compound reaches 1 atm or more is 110° C. or more, preferably 120° C. or more, and more preferably 130° C. or more. The upper limit of the temperature at which the vapor pressure reaches 1 atm or more is not particularly limited, and a compound that starts to decompose before the vapor pressure thereof reaches 1 atm or more can be used.

The second organic silicon compound (B) needs to condense with the first organic silicon compound (A) or an active hydrogen of a hydroxy group and the like located on the surface of a substrate. For this reason, there can be used as the second organic silicon compound a compound in which a carbon fluoride-containing group and a hydrolyzable group are bonded to a silicon atom or a hydrolyzable silane oligomer. Such a compound can improve the slip characteristic exerted by a fluorine-containing group of the above-mentioned compound (A) (in other words, a fluorine-containing group of the structure (a)) by serving as a spacer of the compound (A).

Preferably, the molecular length of the second organic silicon compound (B) is shorter than that of the first organic silicon compound (A). This can make the molecular length of the structure (b) of a transparent film shorter than the molecular length of the structure (a). The molecular length of the second organic silicon compound (B) is preferably ½ or less, more preferably ⅕ or less, and even more preferably ¹⁄₁₀ or less of the molecular length of the first organic silicon compound (A).

In comparing the molecular length of the compound (B) and that of the compound (A), specifically, when the second organic silicon compound (B) is a hydrolyzable silane oligomer having an alkyl group or a fluorine-containing alkyl group, it is preferred that the alkyl group or the fluorine-containing alkyl group is shorter in the number of atoms than the longest straight chain part of the fluorine-containing group of the first organic silicon compound (A). In addition, when the second organic silicon compound (B) is a compound in which a carbon fluoride-containing group and a hydrolyzable group are bonded to a silicon atom, it is preferred that the longest straight chain part of the carbon fluoride-containing group thereof is shorter in the number of atoms than the longest straight chain part of the fluorine-containing group of the first organic silicon compound (A).

When the second organic silicon compound (B) is a compound in which a carbon fluoride-containing group and a hydrolyzable group are bonded to a silicon atom, the carbon fluoride-containing group means the same carbon fluoride-containing group as that of the structure (b) described above. Therefore, the contents described for the carbon fluoride-containing group of the structure (b) can entirely apply to the carbon fluoride-containing group of the second organic silicon compound (B).

Examples of the hydrolyzable group of the second organic silicon compound (B) include those listed above for the hydrolyzable group of the compound (A), and preferable hydrolyzable groups are an alkoxy group, an allyl group, and a halogen atom, and especially, a methoxy group, an ethoxy group, an allyl group, a chlorine atom are preferable. When there are a plurality of hydrolyzable groups, they can be the same or different, but preferably, they are the same.

In the second organic silicon compound (B), the total number of the carbon fluoride-containing group(s) and the hydrolyzable group(s) which are bonded to a silicon atom is usually 4 and may be 2 or 3 (especially, 3). When the total number is 3 or less, an alkyl group (especially, an alkyl group having 1 to 4 carbon atoms), H, a cyano group, or the like can be bonded to the remaining bond or bonds. In particular, it is preferred that the total number of the carbon fluoride-containing group(s) and the hydrolyzable group(s) is 4; in this case, any of that the number of the carbon fluoride-containing group(s) is 3 and the number of the hydrolyzable group(s) is 1, that both the number of the carbon fluoride-containing group(s) and the number of the hydrolyzable group(s) are 2, and that the number of the carbon fluoride-containing group(s) is 1 and the number of the hydrolyzable group(s) is 3 is permissible, and it is preferred that the number of the carbon fluoride-containing group(s) is 1 and the number of the hydrolyzable group(s) is 3.

The combination of the carbon fluoride-containing group and the hydrolyzable group is not particularly limited, and any combination including or not including the formula (1-2) given below is available, and preferred combinations include a combination of a fluoroalkyl group and an alkoxy group (e.g., fluoroalkylalkoxysilanes and the like; especially, fluoroalkyltrialkoxysilanes and the like.), a combination of a fluoroalkyl group and an allyl group (e.g., fluoroalkylallylsilanes and the like; especially, fluoroalkyltriallylsilanes and the like), and a combination of a fluoroalkyl group and a halogen atom (e.g., fluoroalkylhalosilanes and the like; especially, fluoroalkyltrihalosilanes and the like).

Of the aforementioned second organic silicon compounds, the hydrolyzable silane oligomer means an oligomer that is generated from a silane compound having two or more hydrolyzable groups, preferably a silane compound having two or more (especially 3) hydrolyzable groups and a fluorine-containing group (especially, a lower fluorine-containing alkyl group) by hydrolysis condensation. The number of the silicon atoms contained in the oligomer (the number of condensation) is 3 or more, for example, and preferably 5 or more, more preferably 7 or more. The number of condensation is preferably 15 or less, more preferably 13 or less, and even more preferably 10 or less.

Examples of the hydrolyzable group which the oligomer has include the same hydrolyzable group as the oligomer residue in the aforementioned structure (b) has.

Preferably, the second organic silicon compound (B) can be represented by the following formula (1-2) or (2-2). The formula (1-2) is a preferable example of compounds in which a carbon fluoride-containing group and a hydrolyzable group are bonded to a silicon atom, and the formula (2-2) is a preferable example of hydrolyzable silane oligomers.

[Chemical Formula 9]

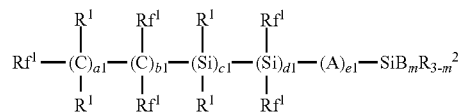

(1-2)

In the formula (1-2), $Rf^1$ each independently represents a fluorine atom or an alkyl group which has 1 to 20 carbon atoms and is substituted with one or more fluorine atoms;

$R^1$ each independently represents a hydrogen atom or a lower alkyl group;

$R^2$ each independently represents an alkyl group having 1 to 20 carbon atoms;

A each independently represents —O—, —COO—, —OCO—, —NR—, —NRCO—, or —CONR—, wherein R represents a hydrogen atom, a lower alkyl group, or a lower fluorine-containing alkyl group;

B each independently represents a hydrolyzable group;

a1, b1, c1, d1, and e1 each independently are an integer of not less than 0 and not more than 100, each of repeating units enclosed in parentheses with a1, b1, c1, d1, or e1 added thereto is present in arbitrary order in the formula, the sum total of a1, b1, c1, d1, and e1 is 100 or less; and m is an integer of not less than 1 and not more than 3.

In the formula (1-2), "lower" means that the number of carbon atom(s) is 1 to 4.

$Rf^1$ preferably is a fluorine atom or a perfluoroalkyl having 1 to 10 carbon atoms (more preferably 1 to 5 carbon atoms). $R^1$ is preferably a hydrogen atom or an alkyl having 1 to 4 carbon atoms. A is preferably —O—, —COO—, or —OCO—. B is preferably an alkoxy group, an allyl group, or a halogen atom, more preferably an alkoxy group having 1 to 4 carbon atoms, an allyl group, or a chlorine atom, even more preferably an alkoxy group having 1 to 4 carbon atoms, particularly preferably a methoxy group or an ethoxy group, and most preferably an ethoxy group. $R^2$ is preferably an alkyl group having 1 to 5 carbon atoms. In addition, a1 is preferably 1 to 30, more preferably 1 to 25, even more preferably 1 to 10, particularly preferably 1 to 5, and most preferably 1 to 2. b1 is preferably 0 to 15, more preferably 0 to 10. c1 is preferably 0 to 5, more preferably 0 to 2. d1 is preferably 0 to 4, more preferably 0 to 2. e1 is preferably 0 to 4, more preferably 0 to 2. m is preferably 2 to 3, more preferably 3. The sum total of a1, b1, c1, d1, and e1 is preferably 3 or more, more preferably 5 or more, and is preferably 80 or less, more preferably 50 or less, even more preferably 20 or less.

In particular, $Rf^1$ is a fluorine atom or a perfluoroalkyl having 1 to 5 carbon atoms, $R^1$ is a hydrogen atom, B is a methoxy group or an ethoxy group, c1, d1, and e1 are each 0, a1 is 1 to 5, b1 is 0 to 5, and m is 3.

Of the second organic silicon compound (B), a compound in which a carbon fluoride-containing group and a hydrolyzable group are bonded to a silicon atom includes, for example, $CF_3$—Si—$(OCH_3)_3$ and $C_jF_{2j+1}$—Si—$(OC_2H_5)_3$ (j is an integer of 1 to 12), and especially preferred are $C_4F_9$—Si—$(OC_2H_5)_3$, $C_6F_{13}$—Si—$(OC_2H_5)_3$, $C_7F_{15}$—Si—$(OC_2H_5)_3$, and $C_8F_{17}$—Si—$(OC_2H_5)_3$. There can be included $CF_3CH_2O(CH_2)_kSiCl_3$, $CF_3CH_2O(CH_2)_kSi(OCH_3)_3$, $CF_3CH_2O(CH_2)_kSi(OC_2H_5)_3$, $CF_3(CH_2)_iSi(CH_3)_2(CH_2)_kSiCl_3$, $CF_3(CH_2)_1Si(CH_3)_2(CH_2)_kSi(OCH_3)_3$, $CF_3(CH_2)_1Si(CH_3)_2(CH_2)_kSi(OC_2H_5)_3$, $CF_3COO(CH_2)_kSiCl_3$, $CF_3COO(CH_2)_kSi(OCH_3)_3$, $CF_3COO(CH_2)_kSi(OC_2H_5)_3$ (i is 1 to 7, preferably 2 to 6, and all of k are 5 to 20, preferably 8 to 15). There can be included $CF_3(CF_2)_m$—$(CH_2)_nSiCl_3$, $CF_3(CF_2)_m$—$(CH_2)_nSi(OCH_3)_3$, and $CF_3(CF_2)_m$—$(CH_2)_nSi(OC_2H_5)$ (all of m are 1 to 10, preferably 2 to 8, all of n are 1 to 5, preferably 2 to 4). $CF_3(CF_2)_p$—$(CH_2)_q$—Si—$(CH_2CH=CH_2)_3$ are also included (all of p are 2 to 10, preferably 2 to 8, all of q are 1 to 5, preferably 2 to 4).

There can be included $CF_3(CF_2)_p$—$(CH_2)_q SiCH_3Cl_2$, $CF_3(CF_2)_p$—$(CH_2)_q SiCH_3(OCH_3)_2$, and $CF_3(CF_2)_p$—$(CH_2)_q SiCH_3(OC_2H_5)_2$ (all of p are 2 to 10, preferably 3 to 7, all of q are 1 to 5, preferably 2 to 4).

The following formula (2-2) is a preferable example when the second organic silicon compound (B) is a hydrolysable silane oligomer.

[Chemical Formula 10]

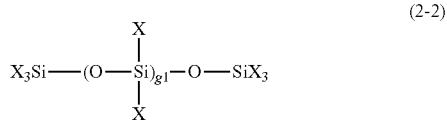

(2-2)

In the above formula (2-2),

X each independently represents a hydrolyzable group, a lower alkyl group, or a lower fluorine-containing alkyl group, and g1 is an integer of not less than 0 and not more than 100.

In the formula (2-2), "lower" means that the number of carbon atom(s) is 1 to 4.

Preferable examples of the hydrolyzable group include alkoxy groups such as a methoxy group, an ethoxy group, a propoxy group, and a butoxy group, and an allyl group. X preferably contains at least one of a hydrolyzable group (especially, a methoxy group, an ethoxy group, or an allyl group). X is further preferably an alkoxy group, and particularly preferably an ethoxy group. g1 is preferably not less than 0 and not more than 10, and more preferably not less than 0 and not more than 7. It is also preferred that at least one of X is a lower fluorine-containing alkyl group.

As the hydrolyzable silane oligomer, for example, there can be included $(H_5C_2O)_3$—Si—$(OSi(OC_2H_5)_2)_4OC_2H_5$, $(H_3CO)_2Si(CH_2CH_2CF_3)$—$(OSiOCH_3(CH_2CH_2CF_3))_4$—$OCH_3$.

It is preferred that the mass ratio of the second organic silicon compound (B) to the first organic silicon compound (A) (namely, the second organic silicon compound (B)/the first organic silicon compound (A)) is 0.1 to 50.

When the transparent film of the present invention is produced, a composition comprising the compound (A) and the compound (B) is preferably diluted by a solvent (C). Especially, it is preferred that the solvent (C) is a fluorine-based solvent. Specific examples of the fluorine-based solvent include chlorofluorocarbons, hydrofluoroethers such as Novec (manufactured by 3M Company), perfluorocarbons such as Fluorinert (manufactured by 3M Company), hydrochlorofluorocarbons such as ASAHIKLIN AK225 (manufactured by ASAHI GLASS CO., LTD.), and hydrofluorocarbons such as ASAHIKLIN AC2000 (manufactured by ASAHI GLASS CO., LTD.). When using a carbon fluoride-based organic solvent containing chlorine, an organic chlorine-based solvent such as chloroform may further be added.

When using a solvent (C), the total amount of the first organic silicon compound (A) and the second organic silicon compound (B) relative to the total amount of the first organic silicon compound (A), the second organic silicon compound (B), and the solvent (C) cannot be generalized because its preferable range depends on a film formation method, but it is 0.001 to 20.0% by mass (preferably 0.01 to 10.0% by mass, more preferably 0.01 to 5.0% by mass, and even more preferably 0.01 to 0.2% by mass), for example. If the concentration is made higher than that, excess compounds bleed out of a coating film and the coating film gets cloudy, leading to remarkable deterioration in abrasion resistance. The film thickness after the film formation is preferably 2 to 50 nm (more preferably 2 to 20 nm, further more preferably 2 to 10 nm).

The composition may further contain a silanol condensation catalyst. Examples of the silanol condensation catalyst include inorganic acids such as hydrochloric acid and nitric acid, organic acids such as acetic acid, metal complexes such as titanium complexes (e.g. ORGATIX TC-750 produced by Matsumoto Fine Chemical Co., Ltd.) and tin complexes, and metal alkoxides. The amount of the silanol condensation catalyst is 0.00001 to 0.1% by mass, preferably 0.00002 to 0.01% by mass, and more preferably 0.0005 to 0.001% by mass, for example, relative to the total amount of the first organic silicon compound (A), the second organic silicon compound (B), and the solvent (C).

The water-repellent and oil-repellent coating composition may contain various types of additives such as an antioxidant, a rust inhibitor, an ultraviolet absorber, a light stabilizer, an antifungal agent, an antibacterial agent, an organism adhesion inhibitor, a deodorant, a pigment, a flame retardant, and an antistatic agent as long as the effect of the present invention is not impaired.

Examples of the antioxidant include phenol-based antioxidants, sulfur-based antioxidants, phosphorus-based antioxidants, and hindered amine-based antioxidants shown below.

Examples of a phenol-based antioxidant include n-octadecyl-3-(4-hydroxy-3,5-di-t-butylphenyl) propionate, 2,6-di-t-butyl-4-methylphenol, 2,2-thio-diethylene-bis-[3-(3,5-di-t-butyl-4-hydroxyphenyl) propionate], tri-ethylene glycol bis-[3-(3-t-butyl-5-methyl-4-hydroxyphenyl) propionate], 3,9-bis[2-{3-(3-t-butyl-4-hydroxy-5-methylphenyl)propionyloxy}-1,1-dimethyl ethyl]-2,4,8,10-tetraoxaspiro[5•5]undecane, pentaerythrityl tetrakis{3-(3,5-di-t-butyl-4-hydroxyphenyl)propionate}, 2-t-butyl-6-(3-t-butyl-2-hydroxy-5-methylbenzyl)-4-methylphenyl acrylate, 2-[1-(2-hydroxy-3,5-di-t-pentylphenyl)ethyl]-4,6-di-t-pentylphenyl acrylate, 1,3,5-trimethyl-2,4,6-tris(3,5-di-t-butyl-4-hydroxybenzyl) benzene, tris(3,5-di-t-butyl-4-hydroxybenzyl) isocyanurate, 1,3,5-tris(4-t-butyl-3-hydroxy-2,6-dimethylbenzyl)-1,3,5-triazine-2,4,6(1H,3H,5H)-trione, 2,2'-methylenebis(6-t-butyl-4-methylphenol), 4,4'-butylidenebis(6-t-butyl-3-methylphenol), and 4,4'-thiobis(6-t-butyl-3-methylphenol).

Examples of a sulfur-based antioxidant include 3,3'-thio-di-propanoicacididodecylester3,3'-thio-di-propanoicacid-itetradecylester, 3,3'-thio-di-propanoicacidioctadecylester, and pentaerythrityltetrakis(3-dodecylthiopropionate).

Examples of a phosphorus-based antioxidant include tris (2,4-di-t-butylphenyl) phosphite, bis(2,4-di-t-butylphenyl) pentaerythritol diphosphite, bis(2,6-di-t-butyl-4-methylphenyl)pentaerythritol diphosphite, bis(2,4-di-cumylphenyl) pentaerythritol diphosphite, tetrakis(2,4-di-t-butylphenyl)-4,4'-biphenylene diphosphonite, and bis[2,4-di-t-butyl,(6-methyl)phenyl]ethyl phosphite.

Examples of a hindered amine-based antioxidant include bis(2,2,6,6-tetramethyl-4-piperidyl) sebacate (melting point: 81 to 86° C.), 2,2,6,6-tetramethyl-4-piperidyl methacrylate (melting point: 58° C.), poly[{6-(1,1,3,3-tetramethylbutyl)amino-1,3,5-triazine-2,4-diyl}[(2,2,6,6-tetramethyl-4-piperidyl)imino}-1,6-hexamethylene{(2,2,6,6-tetramethyl-4-piperidyl)imino}].

Examples of the rust inhibitor include alkanol amines, quaternary ammonium salts, alkanethiols, imidazoline, sodium metavanadate, bismuth citrate, phenol derivatives, polyalkenylamines, alkylimidazoline derivatives, cyanoalkylamines, carboxylic amides, alkylenediamines, pyrimidine, carboxylic acid composites, naphthenic acid composites, and sulfonic acid composites thereof, calcium nitrite, alkylamines and esters, polyalcohol, polyphenol, alkanol amines, sodium molybdate, sodium tungstate, sodium nitrite, sodium phosphonate, sodium chromate, sodium silicate, gelatin, polymers of carboxylic acids, aliphatic and aromatic amines and diamines, ethoxylated amines, imidazole, benzimidazole, nitro compounds, formaldehyde, acetylene alcohol, aliphatic and aromatic thiols, sulfides, and sulfoxides, thiourea, acetylene alcohol, 2-mercaptobenzimidazole, amine or quaternary ammonium salt+halogen ion, acetylene thiol and sulfide, dibenzyl sulfoxide, alkylamine+potassium iodide, dicyclohexylamine nitrite, cyclohexylamine benzoate, benzotriazole, tannin+sodium phosphate, triethanolamine+lauryl sarcosine+benzotriazole, and alkylamine+benzotriazole+sodium nitrite+sodium phosphate.

Examples of the ultraviolet absorber and light stabilizer include 2-(5-methyl-2-hydroxyphenyl)benzotriazole, 2-[2-hydroxy-3,5-bis(α,α-dimethylbenzyl)phenyl]-2H-benzotriazole, 2-(3-t-butyl-5-methyl-2-hydroxyphenyl)-5-chlorobenzotriazole, 2-(2'-hydroxy-5'-t-octylphenyl)benzotriazole, a condensate with methyl 3-[3-t-butyl-5-(2H-benzotriazol-2-yl)-4-hydroxyphenyl]propionate-polyethylene glycol (molecular weight: about 300), hydroxyphenylbenzotriazole derivatives, 2-(4,6-diphenyl-1,3,5-triazin-2-yl)-5-[(hexyl)oxy]-phenol, and 2-ethoxy-2'-ethyloxalic acid bisanilide.

Examples of the antifungal agent and antibacterial agent include 2-(4-thiazolyl)benzimidazole, sorbic acid, 1,2-benzisothiazolin-3-one, sodium (2-pyridylthio-1-oxide), dehydroacetic acid, 2-methyl-5-chloro-4-isothiazolone complex, 2,4,5,6-tetra-chlorophthalonitrile, methyl 2-benzimidazolecarbamate, methyl 1-(butylcarbamoyl)-2-benzimidazolecarbamate, mono- or dibromocyanoacetamides, 1,2-dibromo-2,4-dicyanobutane, 1,1-dibromo-1-nitropropanol, and 1,1-dibromo-1-nitro-2-acetoxypropane.

Examples of the organisms adhesion inhibitor include tetramethylthiuram disulfide, zinc bis(N,N-dimethyldithiocarbamate), 3-(3, 4-dichlorophenyl)-1,1-dimethylurea, dichloro-N-((dimethylamino)sulfonyl)fluoro-N—(P-tolyl)methanesulfenamide, pyridine-triphenylborane, N,N-dimethyl-N'-phenyl-N'(fluorodichloromethylthio)sulfamide, copper(I) thiocyanate, copper(I) oxide, tetrabutylthiuram disulfide, 2,4,5,6-tetrachloroisophthalonitrile, zinc ethylenebisdithiocarbamate, 2,3,5,6-tetra-chloro-4-(methylsulfonyl)pyridine, N-(2,4,6-trichlorophenyl)maleimide, zinc bis(2-pyridinethiol-1-oxide), copper bis(2-pyridinethiol-1-oxide), 2-methylthio-4-t-butylamino-6-cyclopropylamino-s-triazine, 4,5-dichloro-2-n-octyl-4-isothiazolin-3-one, furanones, alkylpyridine compounds, gramin-based compounds, and isonitrile compounds.

Examples of the deodorant include organic acids such as lactic acid, succinic acid, malic acid, citric acid, maleic acid, malonic acid, ethylenediamine polyacetic acid, alkane-1,2-dicarboxylic acid, alkene-1,2-dicarboxylic acid, cycloalkane-1,2-dicarboxylic acid, cycloalkene-1,2-dicarboxylic acid, and naphthalenesulfonic acid; metal salts of fatty acids such as zinc undecenoate, zinc 2-ethylhexanoate, and zinc ricinoleate; metal compounds such as iron oxide, ferrous sulfate, zinc oxide, zinc sulfate, zinc chloride, silver oxide, copper oxide, sodium metal (iron, copper, and the like)-chlorophyllin, metal (iron, copper, cobalt, and the like) phthalocyanine, metal (iron, copper, cobalt, and the like) tetrasulfonic acid phthalocyanine, titanium dioxide, and visible light response type titanium dioxide (nitrogen dope type and the like); cyclodextrins such as α-, β-, or γ-cyclodextrin, and their methyl derivatives, hydroxypropyl derivatives, glucosyl derivatives, and maltosyl derivatives; acrylic acid-based polymers such as porous methacrylic acid polymer and porous acrylic acid polymer; aromatic polymers such as porous divinylbenzene polymer, porous styrene-divinylbenzene-vinylpyridine polymer, porous divinylbenzene-vinylpyridine polymer, and copolymers thereof, and porous materials such as chitin, chitosan, activated carbon, silica gel, activated alumina, zeolite, ceramics.

Examples of the pigment include carbon black, titanium oxide, phthalocyanine-based pigments, quinacridone-based pigments, isoindolinone-based pigments, perylene or perynone-based pigments, quinophthalone-based pigments, diketopyrrolo-pyrrole-based pigments, dioxazine-based pigments, disazo condensed-based pigments, and benzimidazolone-based pigments.

Examples of the flame retardant include decabromobiphenyl, antimony trioxide, phosphorus-based flame retardants, and aluminum hydroxide.

Examples of the antistatic agent include quaternary ammonium-salt type cationic surfactants, betaine type ampholytic surfactants, alkyl phosphate type anionic surfactants, cationic surfactants such as primary amine salts, secondary amine salts, tertiary amine salts, quaternary amine salts, and pyridine derivatives, anionic surfactants such as sulfated oils, soap, sulfated ester oils, sulfated amide oils, sulfated olefin ester salts, sulfated aliphatic alcohol ester salts, sulfated alkyl ester salts, fatty acid ethyl sulfonate salts, alkylnaphthalenesulfonate salts, alkylbenzenesulfonate salts, succinate ester sulfonate salts, phosphate ester salts, nonionic surfactants such as partial fatty acid esters of polyhydric alcohols, ethylene oxide adducts of aliphatic alcohols, ethylene oxide adducts of fatty acids, ethylene oxide adducts of aliphatic amines or aliphatic amides, ethylene oxide adducts of alkylphenols, ethylene oxide adducts of partial fatty acid esters of polyhydric alcohols, and polyethylene glycol, ampholytic surfactants such as carboxylic acid derivatives and imidazoline derivatives.

In the water-repellent and oil-repellent coating composition of the present invention can also be contained a lubricant, a filler, a plasticizer, a nucleating agent, an antiblocking agent, a foaming agent, an emulsifier, a brightening agent, a binder, or the like.

The content of the additives in the transparent film of the present invention to the total weight is, for example, not less than 0.01% by weight and not more than 70% by weight, preferably not less than 0.1% by weight and not more than 50% by weight, more preferably not less than 0.5% by weight and not more than 30% by weight, and even more preferably not less than 2% by weight and not more than 15% by weight.

It is preferred to provide a primer layer between the transparent film and a substrate because durability such as moisture resistance and alkali resistance can thereby be improved more.

Preferred as the primer layer is a layer formed using a composition for forming a primary coat layer comprising a component (D) composed of a compound represented by the following formula (5) and/or a partial hydrolytic condensate thereof, $$Si(X^2)_4 \quad (5)$$

in the formula (5), $X^2$ each independently represents a halogen atom, an alkoxy group, or an isocyanate group.

In the above formula (5), $X^2$ is preferably a chlorine atom, an alkoxy group having 1 to 4 carbon atoms, or an isocyanate group, and it is preferred that four $X^2$ are the same.

Specifically, $Si(NCO)_4$, $Si(OCH_3)_4$, $Si(OC_2H_5)_4$, and the like are used preferably as such a compound represented by the formula (5). The component (D) may be used singly or two or more kinds may be used in combination.

The component (D) contained in the composition for forming a primer layer can be a partial hydrolytic condensate of a compound represented by the above formula (5). The partial hydrolytic condensate of the compound represented by the above formula (5) can be produced by applying a common hydrolytic condensation method using an acid catalyst or a base catalyst. It is noted that the degree of condensation (the degree of polymerization) of the partial hydrolytic condensate needs to be as low as the product can be dissolved in a solvent. The component (D) may be a compound represented by the above formula (5), or a partial hydrolytic condensate of a compound represented by the above formula (5), or a mixture of a compound represented by the above formula (5) and a partial hydrolytic condensate thereof, for example, a partial hydrolytic condensate of a compound represented by the above formula (5) containing an unreacted compound represented by the above formula (5). There are commercially available products of a compound represented by the above formula (5) and a partial hydrolytic condensate thereof, and such commercially available products can be used for the present invention.

The composition for forming a primary coat layer comprises the component (D) and a component (E) composed of a compound represented by the following formula (6) (hereinafter sometimes referred to as compound (6)) and/or a partial hydrolytic condensate thereof, or it may be a composition comprising the above component (D) and a partial hydrolytic condensate of the above component (E), which can contain the component (D) and/or the compound (6), $$(X^3)_3Si—(CH_2)_p—Si(X^3)_3 \quad (6)$$

in the formula (6), $X^3$ each independently represents a hydrolyzable group or a hydroxy group, and p is an integer of 1 to 8.

The compound represented by the formula (6) is a compound having hydrolyzable silyl groups or silanol groups on both ends thereof with a divalent organic group sandwiched therebetween.

Examples of the hydrolyzable group represented by $X^3$ in the formula (6) include groups or atoms the same as those as the above described $X^2$. In terms of the balance of the stability and the sensitivity to hydrolysis of the compound represented by the above formula (6), an alkoxy group and an isocyanate group are preferred as $X^3$, and an alkoxy group is particularly preferred. As the alkoxy group, alkoxy groups having 1 to 4 carbon atoms are preferred, and a methoxy group or an ethoxy group is more preferred. These are suitably selected according to a purpose of the manufacture, an intended application, or the like, and then used. The plurality of $X^3$ present in the formula (6) may be the same type or different type of groups, and it is preferred that they are the same type of groups in terms of accessibility.

Examples of the compound represented by formula (6) include $(CH_3O)_3SiCH_2CH_2Si(OCH_3)_3$, $(OCN)_3SiCH_2CH_2Si(NCO)_3$, $Cl_3SiCH_2CH_2SiCl_3$, $(C_2H_5O)_3SiCH_2CH_2Si(OC_2H_5)_3$, and $(CH_3O)_3SiCH_2CH_2CH_2CH_2CH_2CH_2Si(OCH_3)_3$. The component (E) may be used singly or two or more kinds may be used in combination.

The component contained in the composition for forming a primer layer may be a partial hydrolytic condensate of the compound represented by the formula (6). The partial hydrolytic condensate of the compound represented by the formula (6) can be produced by the same method as that described for the partial hydrolytic condensate of the compound represented by the following formula (5). The degree of condensation (the degree of polymerization) of the partial hydrolytic condensate needs to be as low as the product can be dissolved in a solvent. The component (E) may be a compound represented by the formula (6), or a partial hydrolytic condensate of a compound represented by the formula (6), or a mixture of a compound represented by the formula (6) and a partial hydrolytic condensate thereof, for example, a partial hydrolytic condensate of a compound represented by the above formula (6) containing an unreacted compound represented by the formula (6). There are commercially available products of a compound represented by the above formula (6) and a partial hydrolytic condensate thereof, and such commercially available products can be used for the present invention.

For the primary coat layer, various polysilazanes capable of obtaining an oxidized film containing a silicon as the main component like as the film obtained from the above formula (5) can be used.

The composition for forming a primer layer usually contains an organic solvent in addition to solid components that serve as constituents of a layer taking into account economy, workability, and easiness of controlling the thickness of a primer layer to be formed. The organic solvent is not particularly limited as long as it can dissolve the solid components contained in the composition for forming a primer layer. Examples of the organic solvent include the same compounds as the solvent to be used for the water-repellent and oil-repellent coating composition of the present invention. The organic solvent is not limited to one type of solvent, and two or more types of solvent differing in polarity, evaporation rate, or the like can be mixed and used. When the composition for forming a primer layer contains a partial hydrolytic condensate or a partial hydrolytic co-condensate, the composition may contain a solvent used for producing the partial hydrolytic condensate or the partial hydrolytic co-condensate.

Moreover, even if the composition for forming a primer layer contains neither a partial hydrolytic condensate nor a partial hydrolytic co-condensate, it is preferred also to incorporate a catalyst such as an acid catalyst, which is the same as that commonly used in a partial hydrolytic condensation reaction in order to promote a hydrolytic co-condensation reaction. Even if the composition contains a partial hydrolytic condensate or a partial hydrolytic co-condensate, it is preferred to incorporate a catalyst in a case where the catalyst used for the production of the partial hydrolytic condensate or the partial hydrolytic co-condensate does not remain in the composition. The composition for forming a primary coat layer may contain water for hydrolytic condensation reaction or a hydrolytic co-condensation reaction of the aforementioned constituents.

As a method for forming a primary coat layer using the composition for forming a primer layer, it is possible to use a method known for an organosilane compound-based surface treating agent. For example, a primary coat layer can be formed by applying a composition for forming a primary coat layer to a surface of a substrate using such a method as brush coating, flow coating, spin coating, dip coating, squeegee coating, spray coating, and hand coating, drying as needed in the atmosphere or in a nitrogen atmosphere, and then curing. The conditions for the curing are controlled appropriately according to the type, concentration, or the like of the composition to be used. The curing of the composition for forming a primer layer may be performed simultaneously with the curing of a composition for forming a water-repellent film.

The thickness of the primer layer is not particularly limited as long as it is a thickness large enough for imparting moisture resistance to a transparent film to be formed on the primer layer, for imparting adhesion with a substrate, and for blocking an alkali or the like released from the substrate.

As a method for forming a film on a substrate from a solution for forming a film, a dip coating method, a roll coating method, a bar coating method, a spin coating method, a spray coating method, a die coating method, a vapor deposition method, or the like can be employed. A wet coating method is preferred.

The present application claims benefit of the priority based on Japan Patent Application No. 2014-230154 filed on Nov. 12, 2014. The disclosure of the specification of Japan Patent Application No. 2014-230154 filed on Nov. 12, 2014 is incorporated herein by reference in its entirety.

EXAMPLES

The present invention is described more concretely below with reference to examples. The present invention is not limited by the following examples and can be practiced with appropriate modifications which comply with the foregoing and following spirit and such modifications are embraced within the technical scope of the present invention.

A first organic silicon compound (A) represented by the following formula (a) (molecular weight: about 8000) was synthesized using the method described in Synthesis Examples 1 and 2 of JP-A-2014-15609.

[Chemical Formula 11]

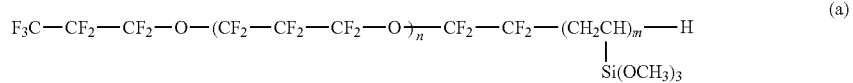

(a)

In the above formula (a), n is 43 and m is an integer of 1 to 6.

Example 1

A compound represented by the above formula (a) (hereinafter, compound (a)) as the first organic silicon compound (A) and Novec 7200 ($C_4F_9OC_2H_5$, manufactured by 3M Company) as the solvent (C) were mixed and stirred at room temperature for a prescribed period of time, and thus a solution for film formation was obtained. In the solution, the proportion of the first organic silicon compound (A) is 0.035% by mass. The resulting solution was dropped onto a glass substrate EAGLE XG manufactured by Corning Incorporated, and the glass substrate was rotated at 3000 rpm for 20 seconds using a spin coater produced by MIKASA Co., Ltd. In addition, heat drying was carried out at 150° C. for 10 minutes to obtain a transparent film on the glass substrate.

Example 2

A transparent film was formed on a glass substrate in the same manner as Example 1 except for that 0.1% by mass of FAS3M ($CF_3$—$C_2H_4$—Si—$(OCH_3)_3$, manufactured by Tokyo Chemical Industry Co., Ltd.) was added as the second organic silicon compound (B).

Example 3

A transparent film was formed on a glass substrate in the same manner as Example 1 except for that 0.1% by mass of FAS9M ($C_4F_9$—$C_2H_4$—Si—$(OCH_3)_3$, manufactured by Tokyo Chemical Industry Co., Ltd.) was added as the second organic silicon compound (B).

Example 4

A transparent film was formed on a glass substrate in the same manner as Example 1 except for that 0.1% by mass of FAS17M ($C_8F_{17}$—$C_2H_4$—Si—$(OCH_3)_3$, manufactured by Tokyo Chemical Industry Co., Ltd.) was added as the second organic silicon compound (B).

Example 5

A transparent film was formed on a glass substrate in the same manner as Example 1 except for that 0.1% by mass of FAS17E ($C_8F_{17}$—$C_2H_4$—Si—$(OC_2H_5)_3$, manufactured by Tokyo Chemical Industry Co., Ltd.) was added as the second organic silicon compound (B).

Comparative Example 1

A transparent film was formed on a glass substrate in the same manner as Example 1 except for that the compound (a) was used in an amount of 0.1% by mass as the first organic silicon compound (A).

Comparative Example 2

A transparent film was formed on a glass substrate in the same manner as Comparative Example 1 except for that 0.1% by mass of FAS3M ($CF_3$—$C_2H_4$—Si—$(OCH_3)_3$, manufactured by Tokyo Chemical Industry Co., Ltd.) was added as the second organic silicon compound (B).

Comparative Example 3

A transparent film was formed on a glass substrate in the same manner as Comparative Example 1 except for that 0.1% by mass of FAS9M ($C_4F_9$—$C_2H_4$—Si—$(OCH_3)_3$, manufactured by Tokyo Chemical Industry Co., Ltd.) was added as the second organic silicon compound (B).

Comparative Example 4

A transparent film was formed on a glass substrate in the same manner as Comparative Example 1 except for that 0.1% by mass of FAS17M ($C_8F_{17}$—$C_2H_4$—Si—$(OCH_3)_3$, manufactured by Tokyo Chemical Industry Co., Ltd.) was added as the second organic silicon compound (B).

(1) Measurement of Water Contact Angle

Using a DM700 manufactured by Kyowa Interface Science Co., Ltd., a contact angle was measured with a waterdrop amount of 3 μl by a θ/2 method.

(2) Measurement of Slip Rate of Waterdrop

On a substrate inclined 8° was dropped a 120 μl waterdrop, and the time for the droplet to slip down 1.5 cm from the initial drop position was measured, and a slip rate was calculated. When the waterdrop did not slip down 1.5 cm or more within 2 minutes, this was judged as x (did not slip).

The results are shown in Tables 1 and 2.

TABLE 1

| | | Example 1 | Example 2 | Example 3 | Example 4 | Example 5 |
|---|---|---|---|---|---|---|
| First Organic Silicon Compound (A) | kind | | | Compound (a) | | |
| | Concentration (wt %) | 0.035 | 0.035 | 0.035 | 0.035 | 0.035 |
| Second Organic Silicon Compound (B)1 | kind | | FAS3M | FAS9M | FAS17M | FAS17E |
| | Concentration (wt %) | | 0.1 | 0.1 | 0.1 | 0.1 |
| Solvent (C) | kind | | | Novec 7200 | | |
| | Concentration (wt %) | 99.965 | 99.865 | 99.865 | 99.865 | 99.865 |
| Contact angle (°) | | 112 | 112 | 113 | 112 | 112 |
| Slip Rate (mm/s) | | 0.9 | 1.4 | 1.6 | 1.3 | 2.5 |

TABLE 2

| | | Comparative Example 1 | Comparative Example 2 | Comparative Example 3 | Comparative Example 4 |
|---|---|---|---|---|---|
| First Organic Silicon Compound (A) | kind | | Compound (a) | | |
| | Concentration (wt %) | 0.1 | 0.1 | 0.1 | 0.1 |
| Second Organic Silicon Compound (B) | kind | | FAS3M | FAS9M | FAS17M |
| | Concentration (wt %) | | 0.1 | 0.1 | 0.1 |
| Solvent (C) | kind | | Novec 7200 | | |
| | Concentration (wt %) | 99.9 | 99.8 | 99.8 | 99.8 |
| Contact angle (°) | | 114 | 113 | 113 | 115 |
| Slip Rate (mm/s) | | x | x | x | x |

As shown in Tables 1 and 2, a good slip characteristic of waterdrop was exerted in Examples 1 to 5 in which a compound (a) whose concentration was adjusted appropriately was used, and a slip characteristic of waterdrop better than those of Example 1 was realized in Examples 2 to 5 in which a prescribed compound (B) was used together with the compound (a).

On the other hand, a slip characteristic of waterdrop deteriorated in Comparative Example 1 in which the concentration of the compound (a) was inappropriate, and a slip characteristic was not improved successfully in Comparative Example 2 to Comparative Example 4 in which a prescribed compound (B) was further used in Comparative Example 1.

The invention claimed is:

1. A transparent film having a polysiloxane backbone,
   wherein the transparent film has a structure (a) in which a fluorine-containing group having a perfluoroalkyl group or a perfluoropolyether group on the free end side thereof is bonded to a silicon atom of the polysiloxane backbone,
   the fluorine-containing group having the perfluoroalkyl group on the free end side thereof is a group represented by the following formula (3-1) or (4-1),

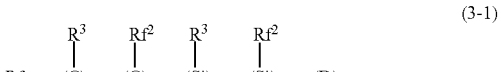

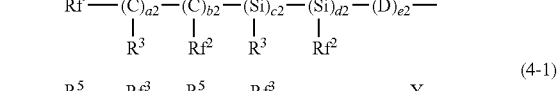

in the formula (3-1),

Rf represents a fluorine atom or an alkyl group which has 1 to 20 carbon atoms and is substituted with one or more fluorine atoms, $Rf^2$ each independently represents a fluorine atom or an alkyl group which has 1 to 20 carbon atoms and is substituted with one or more fluorine atoms, $R^3$ each independently represents a hydrogen atom or an alkyl group having 1 to 4 carbon atoms, D each independently represents —O—, —COO—, —OCO—, —NR—, —NRCO—, or —CONR—, wherein R represents a hydrogen atom, an alkyl group having 1 to 4 carbon atoms, or a fluorine-containing alkyl group having 1 to 4 carbon atoms, a2, c2, d2, and e2 are each independently an integer of not less than 0 and not more than 600, and the sum total of a2, b2, c2, d2, and e2 is 13 or more, b2 is not less than 20 and not more than 600, in the formula (4-1), Rf represents a fluorine atom or an alkyl group which has 1 to 20 carbon atoms and is substituted with one or more fluorine atoms, $Rf^3$ each independently represents a fluorine atom or an alkyl group which has 1 to 20 carbon atoms and is substituted with one or more fluorine atoms, $R^5$ each independently represents a hydrogen atom or an alkyl group having 1 to 4 carbon atoms, G each independently represents —O—, —COO—, —OCO—, —NR—, —NRCO—, or —CONR—, wherein R represents a hydrogen atom, an alkyl group having 1 to 4 carbon atoms, or a fluorine-containing alkyl group having 1 to 4 carbon atoms, Y each independently represents a hydrogen atom or an alkyl group having 1 to 4 carbon atoms, Z represents a hydrogen atom or a halogen atom, a3, c3, d3, and e3 are each independently an integer of not less than 0 and not more than 600, and the sum total of a3, b3, c3, d3, and e3 is 13 or more, b3 is not less than 20 and not more than 600, h3 is an integer of not less than 0 and not more than 2, q is an integer of not less than 1 and not more than 10, the fluorine-containing groups are bonded to some silicon atoms of the polysiloxane backbone in the structure (a), the transparent film has a structure (b) in which carbon fluoride-containing groups or hydrolysable silane oligomer residue are bonded to some of the remaining silicon atoms of the polysiloxane backbone, the molecular length of the structure (b) is shorter than the molecular length of the structure (a), and the transparent film has a slip rate of 0.2 mm/s or more for a 120 μl waterdrop on an 8° incline.

2. The transparent film according to claim 1, wherein the slip rate for a 120 μl waterdrop on an 8° incline is 0.5 mm/s or more.

3. The transparent film according to claim 1, wherein the fluorine-containing group of the structure (a) comprises a hydrocarbon group.

4. The transparent film according to claim 1, wherein the structure (b) has a hydrolyzable silane oligomer residue having an alkyl group or a fluorine-containing alkyl group, and the alkyl group or the fluorine-containing alkyl group is shorter in the number of atoms than the longest straight chain part of the fluorine-containing group of the structure (a).

5. The transparent film according to claim 1, wherein the structure (b) has the carbon fluoride-containing group, and the longest straight chain part of the carbon fluoride-containing group is shorter in the number of atoms than the longest straight chain part of the fluorine-containing group of the structure (a).

6. The transparent film according to claim 1, wherein the carbon fluoride-containing group or the hydrolyzable silane oligomer residue of the structure (b) is each represented by the following formula (1-1) or (2-1),

[Chemical formula 1]

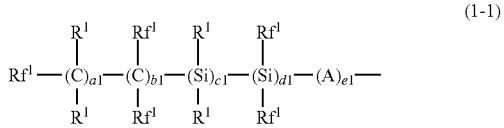

(1-1)

[Chemical formula 2]

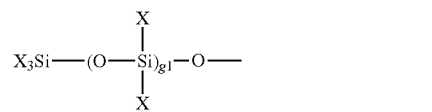

(2-1)

in formulae (1-1) and (2-1), $Rf^1$ each independently represents a fluorine atom or an alkyl group substituted with one or more fluorine atoms and having 1 to 20 carbon atoms;

$R^1$ each independently represents a hydrogen atom or an alkyl group having 1 to 4 carbon atoms;

A each independently represents —O—, —COO—, —OCO—, —NR—, —NRCO—, and —CONR—, wherein R represents a hydrogen atom, an alkyl group having 1 to 4 carbon atoms, or a fluorine-containing alkyl group having 1 to 4 carbon atoms;

X each independently represents a hydrolyzable group, an alkyl group having 1 to 4 carbon atoms, or a fluorine-containing alkyl group having 1 to 4 carbon atoms;

a1, b1, c1, d1, e1, and g1 each independently are an integer of not less than 0 and not more than 100, each of repeating units enclosed in parentheses with a1, b1, c1, d1, or e1 added thereto is present in arbitrary order in the formula, and the sum total of a1, b1, c1, d1, and e1 is 100 or less.

7. The transparent film according to claim 3, wherein the molecular length of the structure (b) is shorter than the molecular length of the structure (a).

8. The transparent film according to claim 7, wherein the structure (b) has the carbon fluoride-containing group, and the longest straight chain part of the carbon fluoride-containing group is shorter in the number of atoms than the longest straight chain part of the fluorine-containing group of the structure (a).

9. The transparent film according to claim 8, wherein the carbon fluoride-containing group or the hydrolyzable silane oligomer residue of the structure (b) is each represented by the following formula (1-1) or (2-1),

[Chemical formula 1]

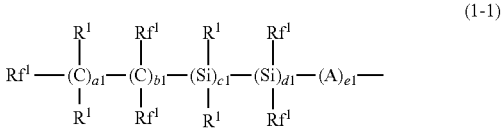

(1-1)

[Chemical formula 2]

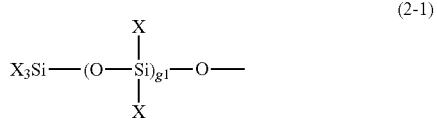

(2-1)

in formulae (1-1) and (2-1), $Rf^1$ each independently represents a fluorine atom or an alkyl group substituted with one or more fluorine atoms and having 1 to 20 carbon atoms;

$R^1$ each independently represents a hydrogen atom or an alkyl group having 1 to 4 carbon atoms;

A each independently represents —O—, —COO—, —OCO—, —NR—, —NRCO—, and —CONR—, wherein R represents a hydrogen atom, an alkyl group having 1 to 4 carbon atoms, or a fluorine-containing alkyl group having 1 to 4 carbon atoms;

X each independently represents a hydrolyzable group, an alkyl group having 1 to 4 carbon atoms, or a fluorine-containing alkyl group having 1 to 4 carbon atoms;

a1, b1, c1, d1, e1, and g1 each independently are an integer of not less than 0 and not more than 100, each of repeating units enclosed in parentheses with a1, b1, c1, d1, or e1 added thereto is present in arbitrary order in the formula, and the sum total of a1, b1, c1, d1, and e1 is 100 or less.

10. The transparent film according to claim 1, wherein e2 is equal to or more than ⅕ of the sum total of a2, b2, c2, and d2 and equal to or less than the sum total of a2, b2, c2, and d2, e2 is not less than 4 and not more than 600, e3 is not less than ⅕ of the sum total of a3, b3, c3, and d3 and equal to or less than the sum total of a3, b3, c3, and d3, and e3 is not less than 4 and not more than 600.

\* \* \* \* \*